(12) United States Patent
Dohles et al.

(10) Patent No.: US 12,421,784 B2
(45) Date of Patent: Sep. 23, 2025

(54) WINDOW LIFTER FOR A MOTOR VEHICLE AND METHOD OF MANUFACTURING THE WINDOW LIFTER

(71) Applicant: Brose Fahrzeugteile SE & Co. Kommanditgesellschaft, Bamberg, Bamberg (DE)

(72) Inventors: Hilmar Dohles, Itzgrund (DE); Florian Quin, Rattelsdorf (DE); Udo Taubmann, Bad Rodach Sülzfeld (DE); Doris Wolf, Rödental (DE)

(73) Assignee: Brose Fahrzeugteile SE & Co. Kommanditgesellschaft, Bamberg, Bamberg (DE)

( * ) Notice: Subject to any disclaimer, the term of this patent is extended or adjusted under 35 U.S.C. 154(b) by 0 days.

(21) Appl. No.: 18/533,490

(22) Filed: Dec. 8, 2023

(65) Prior Publication Data

US 2024/0110429 A1 Apr. 4, 2024

Related U.S. Application Data

(63) Continuation of application No. PCT/EP2022/065547, filed on Jun. 8, 2022.

(30) Foreign Application Priority Data

Jun. 8, 2021 (DE) .................... 10 2021 205 768.3

(51) Int. Cl.
*E05F 15/689* (2015.01)
*B60J 1/17* (2006.01)
(Continued)

(52) U.S. Cl.
CPC ............ *E05F 15/6909* (2024.01); *B60J 1/17* (2013.01); *E05D 15/165* (2013.01);
(Continued)

(58) Field of Classification Search
CPC ... E05F 15/6909; E05F 15/689; E05F 11/382; B60J 1/17; E05D 15/165; E05Y 2201/66;
(Continued)

(56) References Cited

U.S. PATENT DOCUMENTS

| | | | |
|---|---|---|---|
| 6,393,929 B1 * | 5/2002 | Quere | E05F 15/697 74/411 |
| 11,286,704 B2 * | 3/2022 | Takaoka | E05F 11/385 |

(Continued)

FOREIGN PATENT DOCUMENTS

| | | | | |
|---|---|---|---|---|
| CN | 111098677 A | * | 5/2020 | B60J 1/17 |
| CN | 112145018 A | * | 12/2020 | B60J 1/17 |

(Continued)

*Primary Examiner* — Justin B Rephann
(74) *Attorney, Agent, or Firm* — Laurence A. Greenberg; Werner H. Stemer; Ralph E. Locher

(57) ABSTRACT

A window lifter for a motor vehicle contains a plastic component and a metal component. The plastic component is at least in sections in mechanical contact with the metal component on a bearing surface, and wherein microcapsules are embedded into the plastic material of the plastic component at least in the region of the bearing surface. The microcapsules are filled with a lubricant.

14 Claims, 3 Drawing Sheets

(51) Int. Cl.
*E05D 15/16* (2006.01)
*E05F 11/38* (2006.01)

(52) U.S. Cl.
CPC .......... *E05F 11/382* (2013.01); *E05F 15/689* (2015.01); *E05Y 2201/66* (2013.01)

(58) Field of Classification Search
CPC ........... E05Y 2201/664; E05Y 2900/55; E05Y 2800/412; E05Y 2800/68
USPC .......................................................... 49/352
See application file for complete search history.

(56) References Cited

U.S. PATENT DOCUMENTS

| | | | |
|---|---|---|---|
| 11,578,754 B2 * | 2/2023 | Andersson | C10M 171/00 |
| 2014/0157677 A1 | 6/2014 | Walawender et al. | |
| 2019/0010299 A1 * | 1/2019 | Markgraf | E05D 15/16 |
| 2020/0071981 A1 * | 3/2020 | Beadle | F16N 15/02 |
| 2020/0087855 A1 * | 3/2020 | Ficyk | E05F 11/483 |
| 2022/0025687 A1 * | 1/2022 | Shiroma | E05F 11/486 |
| 2024/0110429 A1 * | 4/2024 | Dohles | E05F 11/382 |

FOREIGN PATENT DOCUMENTS

| | | | | |
|---|---|---|---|---|
| DE | 7241600 | U | 9/1976 | |
| DE | 4135955 | C1 * | 11/1992 | |
| DE | 102005038628 | A1 * | 2/2007 | ........... E05F 11/382 |
| DE | 202006015585 | U1 | 2/2008 | |
| DE | 102018205791 | A1 | 10/2019 | |
| DE | 102018217247 | A1 * | 4/2020 | ........... E05F 11/483 |
| DE | 102021205768 | A1 * | 12/2022 | ............... B60J 1/17 |
| FR | 2764932 | A1 * | 12/1998 | ........... E05F 11/486 |
| FR | 3112724 | A1 * | 1/2022 | |
| WO | WO-8701996 | A1 * | 4/1987 | |
| WO | WO-2016050568 | A1 * | 4/2016 | ........... A47B 88/483 |
| WO | WO-2019230882 | A1 * | 12/2019 | ........... E05D 15/165 |
| WO | WO-2021079963 | A1 * | 4/2021 | ............... B60J 1/17 |

* cited by examiner

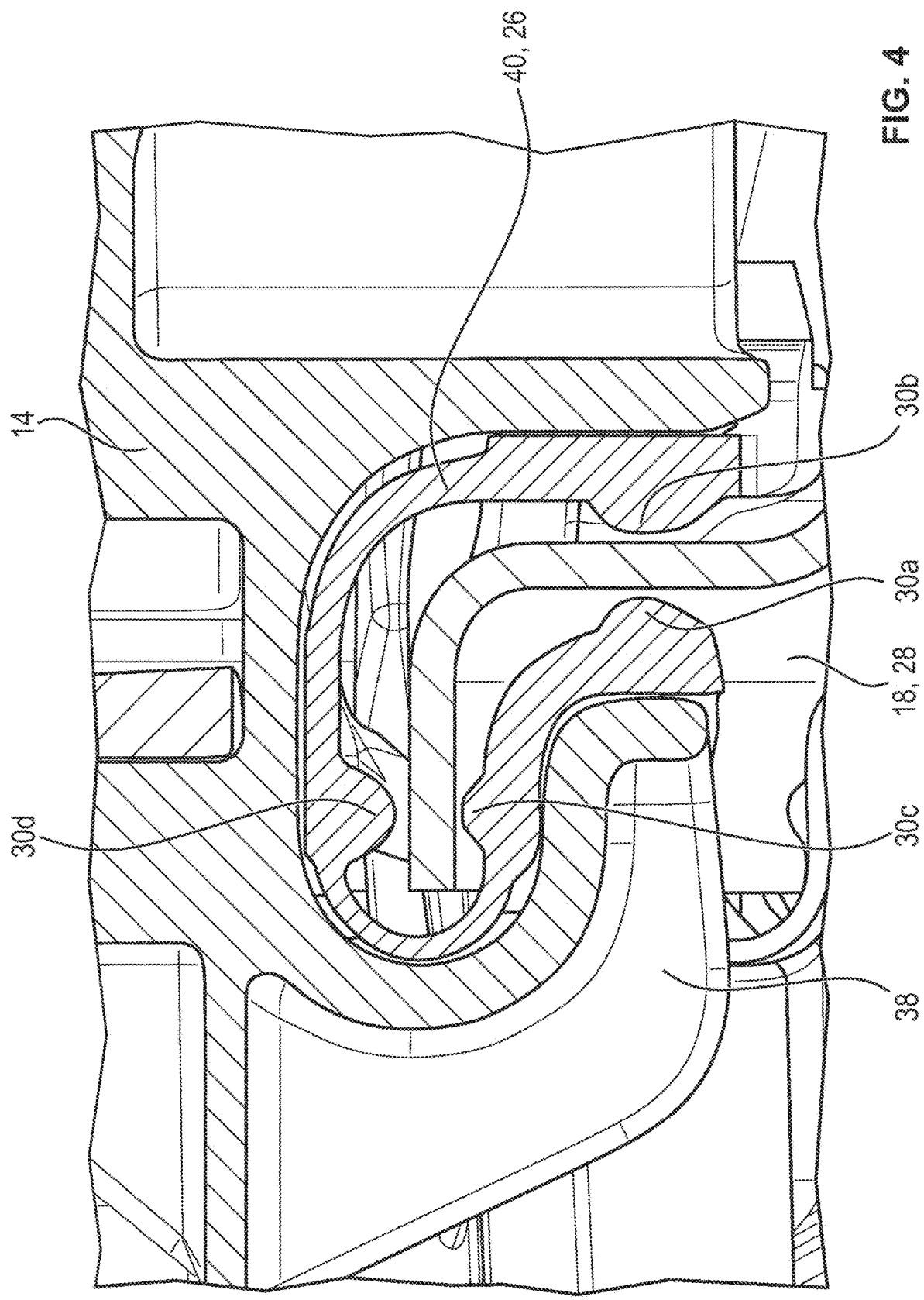

WINDOW LIFTER FOR A MOTOR VEHICLE AND METHOD OF MANUFACTURING THE WINDOW LIFTER

CROSS-REFERENCE TO RELATED APPLICATION

This application is a continuation, under 35 U.S.C. § 120, of copending International Patent Application PCT/EP2022/065547, filed Jun. 8, 2022, which designated the United States; this application also claims the priority, under 35 U.S.C. § 119, of German Patent Application DE 10 2021 205 768.3, filed Jun. 8, 2021; the prior applications are herewith incorporated by reference in their entirety.

FIELD AND BACKGROUND OF THE INVENTION

The invention relates to a window lifter for a motor vehicle, containing a plastic component and a metal component, wherein the plastic component is at least partially in mechanical touching contact with a metal component on a contact surface. The invention also relates to a door module with such a window lifter and to the use of microcapsules in a granulated plastic.

Nowadays, movable vehicle windowpanes are usually moved between a closed position and an open position by electrically or electromotively operated adjusting devices in the form of (vehicle) window lifters. Such a window lifter generally contains an (electric) adjusting motor and an adjusting mechanism which connects, that is to say couples in terms of force transmission, the adjusting motor to the windowpane. To mount the window lifter in a vehicle door, it is possible to pre-mount the window plate on a carrier plate, also referred to as door module carrier or assembly carrier. The structural unit of window lifter and door module carrier (and possibly further functional elements of the vehicle door) is also referred to below as door module.

The adjusting mechanism of such a window lifter contains, for example, a cable traction mechanism, which is guided for the one part in a cable drum, which winds up and unwinds the cable traction mechanism, and for the other part on a driver or rail slider with repeated deflection by means of (cable) deflection rollers and is fixed there. To guide the windowpane, in the case of a vehicle door the windowpane is provided for example at a front and/or rear lateral window edge with at least one rail slider as pane guiding element, the rail slider being guided displaceably along the height of the vehicle (Z direction) in at least one guide rail, acting as an adjustment or guide track, of the adjusting mechanism.

Rail sliders of the aforementioned type generally have a main body which is made of plastic and has a guide region, which in the mounted state engages around the guide rail in the form of a rail wraparound means. In other words, the guide rail sits in the guide region. The main body and the guide rail thus engage with one another. The main body is mounted so as to be displaceable along the guide rail when in engagement, with the result that the windowpane is guided linearly between the closed position and the open position.

The adjusting mechanism of such window lifters therefore contains a multiplicity of components which are movable relative to one another. In this respect, the components are for example in the form of plastics parts for reasons of cost and weight reduction. In the case of movable plastics parts, high frictional forces are a frequent cause of damage. To extend the service life of such plastics parts, friction reduction and wear protection are therefore desirable. To this end, the contact surfaces between the movable components are usually wetted with a lubricant or slip agent.

In this respect, in the case of lubricants a distinction is made between dry lubricants and liquid or pasty lubricants. Dry lubricants or solid lubricants, such as powder coatings of graphite or ceramic, enable comparatively easy incorporation in plastics but dry lubricants have only limited material diversity. Therefore, use is frequently made of liquid, viscous or pasty lubricants, such as lubricating oils or lubricating greases, which have greater material diversity and improved distribution or wetting properties. Furthermore, the microcapsules enable the specific use of highly effective greases, such as silicone.

For example, the rail slider or its main body is in the form of an injection molded part, wherein the guide rail is a metal rail, for example made of aluminum. The guide rail is in this case for example powder-coated or galvanized. To improve the sliding properties, use is frequently made of a sliding insert made of polyamide (PA) or polyoxymethylene (POM) in the rail wraparound means of the rail slider. A translational or sliding interface is formed between the rail slider and the guide rail, wherein in addition a lubricating grease (for example FK 3) is generally also introduced between the powder coating (powder coat) and the sliding insert.

A further example is a deflection roller which is made of POM and is rotatably mounted on the door module by means of a metallic bolt. The rotary interface between the bolt and the deflection roller is frequently wetted with a lubricating grease in this case.

Lubricating greases or lubricating oils disadvantageously need to be metered externally and are consumed in comparatively large amounts. Furthermore, the outlay for applying liquid lubricants is higher than in the case of dry lubricants. In addition, if the application of liquid or pasty lubricants is performed incorrectly or forgotten, this leads to damage or destruction of the components involved, as a result of which the quality of the window lifter is disadvantageously reduced.

SUMMARY OF THE INVENTION

The invention is based on the object of specifying a particularly suitable window lifter for a motor vehicle. In particular, the intention is to ensure lubrication of the adjusting mechanism that as far as possible has reduced outlay and is reliable. The invention is also based on the object of specifying a particularly suitable door module and a particularly suitable use.

According to the invention, the object is achieved in terms of the window lifter by the features of the independent window lifter claim, in terms of the door module by the features of the independent door module claim and in terms of the use by the features of the independent method claim. The dependent claims relate to advantageous embodiments and refinements. The advantages and embodiments mentioned with regard to the window lifter can be transferred expediently also to the door module and/or the use, and vice versa.

With the foregoing and other objects in view there is provided, in accordance with the invention, a window lifter for a motor vehicle. The window lifter includes a metal component and a plastic component having a contact surface. The plastic component is at least partially in mechanical touching contact with the metal component on the contact surface. The plastic component has microcapsules filled with a lubricant being embedded in a plastic material of the plastics component at least in a region of the contact surface.

The window lifter according to the invention is intended, suitable and designed for a motor vehicle. The window lifter contains an electric adjusting motor and an adjusting mechanism coupled thereto.

The adjusting mechanism contains a plastic component and a metal component which are movable relative to one another and between which a mechanical interface is formed. The plastic component is, for example, in the form of an injection molded part. The plastic component in this respect has a contact surface in the form of an interface with the metal component which is subject to mechanical or frictional loading and at which the plastics component and the metal component are at least partially in mechanical touching contact.

According to the invention, at least in the region of the contact surface microcapsules (microbubbles) filled with a lubricant are embedded in the plastics material of the contact surface. Here, the microcapsules are introduced in the material of the contact surface for example on the surface or close to the surface. A lubricant in this respect is understood to mean in particular a pasty or liquid lubricant. In other words, a liquid or pasty lubricant, such as a lubricating grease or lubricating oil, is immobilized in enclosed fashion by means of microencapsulation and integrated in the contact surface of the plastics component. This produces a particularly suitable window lifter.

The lubrication concept according to the invention enables local lubrication of the components as required, for the purpose of friction reduction and wear protection, as a result of which in particular the plastics component is improved. In particular, the lubricant microcapsules enable long-term friction minimization for the plastics components. This is consequently transferred advantageously to the service life of the window lifter, as a result of which maintenance work and repair work is reduced.

The lubricant microcapsules make it possible to save on dry lubricants, such as a powder coat. Furthermore, the microencapsulation can be integrated with reduced outlay in an automation installation for producing the plastic component. The microencapsulation also makes it possible to improve the quality of the window lifter, since the lubricant cannot be applied incorrectly or forgotten. In particular, during production, $CO_2$ emissions are reduced owing to the omission of lubricant. In addition, erosion is minimized or completely eliminated.

In this respect, the microencapsulation of the lubricant takes place in particular in the manner of a core-shell encapsulation, in which the lubricant (core material) is enclosed by a shell material, in particular a plastics material. The microcapsules here have, for example, a diameter of a few millimeters down to approximately 1 μm (micrometer). Depending on the core material and shell material, the microcapsule diameter is for example between 5 μm and 100 μm.

The microencapsulation is designed in this respect such that it opens when subjected to sufficiently high mechanical loading, and releases the lubricant incorporated therein. "Opening" of the microcapsules is in this respect to be understood to mean in particular a rupture of the shell material, upon which the lubricant is generally completely released in a short period of time (burst). The loading considered to be sufficient in this case is incidental in the first instance. In particular, the loading above which the microcapsules open can be predefined by suitable selection of the material for the encapsulation or by variation of the capsule diameter (volume of the core material) and/or of the capsule wall thickness (wall material thickness) of the microcapsules. This can be determined for example by trials and experiments for the respective application of the components.

Since the microencapsulation is arranged in particular in the region of the contact surface, or the mechanical interface or friction site, when the microcapsules open the lubricant is distributed locally or at certain points at the sites subjected to mechanical loading, with the result that reliable lubrication of the components is ensured. The microencapsulation thus advantageously makes it possible to dispense lubricant only as required and in small concentrations.

The microencapsulation makes it possible to introduce the liquid or pasty lubricant into the plastic of the plastics component in the form of a finely distributed solid (powder). This effectively combines the advantages of liquid and dry lubricants. In particular, the microcapsules enable comparatively easy incorporation in the plastics material, with it being possible at the same time to utilize the greater material diversity and improved distribution or wetting properties of the pasty or liquid lubricant.

The use according to the invention of microencapsulated lubricant at the interface enables lubrication even in the case of elements and components which are otherwise difficult to access. Furthermore, as a result of the microencapsulation integrated directly in the plastics component, it is possible to dispense with lubricants, in particular dry lubricants or powder coatings, on the metal component.

In a suitable embodiment, the plastics material of the plastics component is a polypropylene (PP), a polyoxymethylene (POM), or a polyamide (PA), in particular polyamide-6 (PA-6).

In an expedient embodiment, the proportion of microcapsules in the plastics material of the contact surface is between 1% by weight (weight percent) and 20% by weight. In other words, the lubricant proportion in the contact surface is, for example, 1% by weight, 5% by weight or 20% by weight. Here, the proportion can be adapted flexibly to the respective lubrication requirements between the plastics component and the metal component, with the result that sufficient and operationally reliable lubrication of the components, or of the interface, is ensured.

In a conceivable embodiment, the microcapsules, that is to say in particular the shell material, are made of the plastics material of the plastics component or of the contact surface. As a result, reliable blending of the plastics material of the contact surface and the microencapsulated lubricant is ensured. For example, in this case the plastics material is PA.

The lubrication concept according to the invention can be applied flexibly in this case to various interfaces containing plastic components or plastics parts. For example, the microencapsulated lubricant can be used for (plastics) gearwheels. The lubricant microcapsules can also be used for those interfaces for which standard lubricating greases cause problems owing to adhesion.

The lubricant microcapsules are particularly advantageous in the case of sliding interfaces, so that for example a saving can be made on powder coatings on (guide) rails. In an advantageous application, the plastics component is in the form of a sliding insert for a rail wraparound means of a rail slider, wherein the corresponding metal component is a guide rail for linear guidance of the rail slider, around which guide rail the rail wraparound means engages or which guide rail it surrounds, at least partially. The sliding insert in this case is in particular made of PA or POM.

In a similarly advantageous application, the plastics component is a (cable) deflection roller, for example made of POM, wherein the metal component is a bolt which mounts the deflection roller. The bolt here is for example fastened to a door module carrier in the region of the guide rail. This ensures suitable lubrication for the rotary deflection roller.

In another advantageous application, the plastics component is in the form of a cable drum, wherein the metal component is a cable, for example a steel cable, which can be wound up on and unwound from the cable drum.

In a possible embodiment, the microcapsules are not only located in the contact surface or boundary layer but are distributed throughout the plastics component. In other words, the microcapsules are embedded throughout the plastics material of the plastics component. Preferably, in this case the microcapsules are as far as possible homogeneously distributed, or evenly distributed, in the plastics material. This means that the plastics material has substantially a constant density of microcapsules in the volume of the element or component. As a result, the plastics component or the plastics material has a uniform strength or mechanical stability.

To produce such a plastics material with evenly or homogeneously distributed, according to the invention it is possible for example to use a granulated plastic with embedded microcapsules. Introducing the microcapsules into the granulate ensures that there is a particularly even distribution of microcapsules in the finished plastics component. In particular, there is therefore an even distribution of the microcapsules already during the production of the plastics material, that is to say in an extruder screw, or in a plastics melt. The use of granulated plastic with integrated microcapsules therefore makes it possible to use existing injection molding installations to produce the plastics component without refitting or retrofitting. As a result, particularly easy and inexpensive production of the window lifter is enabled. Expediently, in this case the shell of the microencapsulation, that is to say in particular the wall or wall thickness of the microcapsules, is dimensioned such that the microcapsules do not open during the production of the plastics component, that is to say in the melt or in the extruder.

An additional or further aspect of the invention provides that microcapsules with different capsule properties are embedded in the plastics material. A capsule property in this respect is understood to mean in particular a geometric property of the (capsule) shell, that is to say a (shell) shape and/or a (shell) diameter and/or a (shell) wall thickness. The conjunction "and/or" here and in the following text should be understood in such a way that the features linked by this conjunction can be developed both in combination and as alternatives to one another. The different capsule properties result in the realization of effectively different pressure stages from which the microcapsules open and thus release the lubricant. As a result, a relubrication solution is easily realized.

Preferably, an activator is provided when the window lifter is being mounted, the activator working the contact surface in the course of mounting and as a result causing at least some of the microcapsules to open, with the result that an initial or preliminary lubrication for the window lifter is realized.

In a conceivable embodiment, the activator is realized by an activation tool, for example a cutting or sanding tool, in particular sandpaper. In addition or as an alternative, for example, a geometric activator in the form of a mating contour of the metal component is conceivable.

The mating contour can in this respect be designed for example in the manner of a punch, with the result that, when the plastics component is moved toward the metal component, an increasing contact pressure which causes the microcapsules in the contact surface to open and thus the bearing point to be lubricated is generated. As an alternative, the mating contour may for example be in the form of a sharp-edged contour or burr, which selectively works the contact surface during installation or in the course of mounting.

Preferably, the mating contour is in the form of a local change in the surface finish, in particular the surface roughness, of the metal component. In particular, the metal component has increased surface roughness in the region of the mating contour. The region of the mating contour is thus rougher or more uneven than the rest of the metal component.

In the case of a metal component in the form of a guide rail, the mating contour is for example arranged in the region of a top and/or bottom end stop for the plastics component in the form of a sliding insert. If the plastics component is moved up to the end stop, the contact surface is worked by the mating contour, with the result that greater mechanical loading acts locally on the contact surface, and therefore the microcapsules open and release the lubricant. As a result, it is possible to mount the sliding insert between the end stops with as far as possible a reduction in friction.

The door module according to the invention is intended, suitable and configured for a motor vehicle, in particular for a side door of the motor vehicle. The door module contains a door module carrier and a window lifter as described above arranged thereon. This produces a particularly suitable door module.

Other features which are considered as characteristic for the invention are set forth in the appended claims.

Although the invention is illustrated and described herein as embodied in a window lifter for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIG. 4 is a perspective partial section view across a travel direction of a rail slider on a guide rail.

DETAILED DESCRIPTION OF THE INVENTION

Parts and variables which correspond to one another are always provided with the same reference signs in all the figures.

Figure 1:
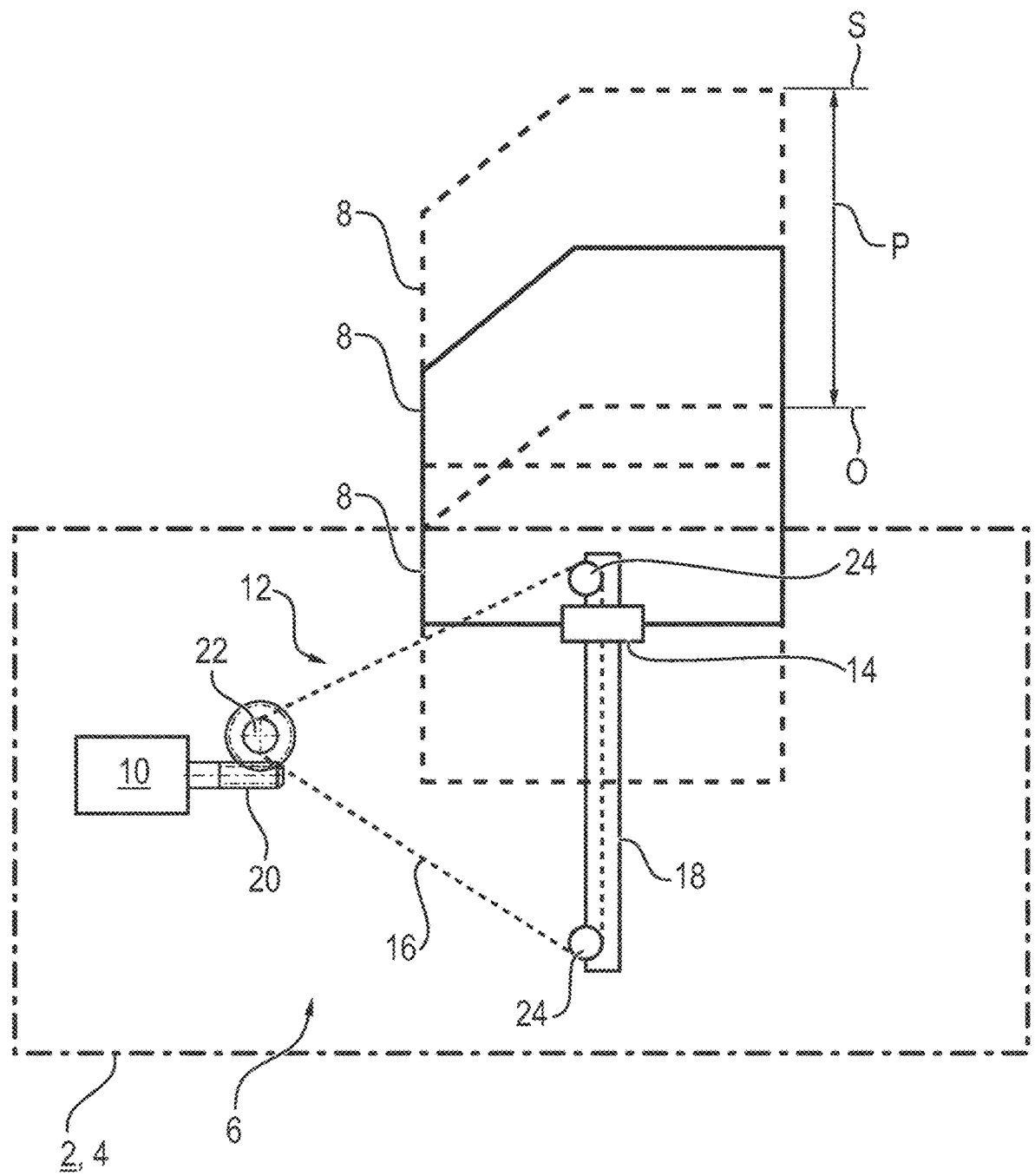
FIG. 1 is a schematic and simplified illustration of a door module with a window lifter according to the invention.

Referring now to the figures of the drawings in detail and first, particularly to FIG. 1 thereof, there is shown a simplified and schematic illustration of a door module 2 of a motor vehicle. The door module 2 is installed in a side door, not illustrated in more detail, of the motor vehicle. The door module 2 contains a carrier plate as door module carrier 4, on which an electric (vehicle) window lifter 6 as adjusting device for a (vehicle) windowpane 8 of a motor vehicle is shown.

The (vehicle) window lifter 6 contains an adjusting motor 10 which acts on the windowpane 8 by means of an adjusting mechanism 12 and a rail slider 14. In the exemplary embodiment shown, the window lifter 6 is in the form of a single-strand lifter or single-strand cable traction window lifter, wherein the adjusting mechanism 12 contains a cable pull 16 and a guide rail 18 for the rail slider 14.

The adjusting motor 10 of the window lifter 6 drives a cable drum 22 of the adjusting mechanism 12 via a spur-gear or worm-gear transmission 20. A traction cable of the cable pull 16 is arranged on the cable drum 22 in such a way that the traction cable is wound up and unwound when the cable drum 22 is made to rotate by the transmission 20. The cable pull 16, for example in the form of a Bowden cable, moves the rail slider 14 and thus the window pane 8 via deflection rollers 24 of the guide rail 18.

When the adjusting motor 10 is actuated, the windowpane 8 is moved into its (pane) position P. The windowpane 8 in this respect can be moved reversibly between a closed position S, which constitutes the highest possible position P, and an open position O, which constitutes the lowest possible position P. The windowpane 8 is indicated in dashed line in FIG. 1 in each of these positions S and O. Continuous lines, by contrast, are used to illustrate the windowpane 8 in a half-open intermediate position.

The components or elements of the adjusting mechanism 12 are in the form of plastics components or metal components here. In particular in the case of plastics components operatively connected directly to metal components, a lubrication concept according to the invention for reducing friction and wear is integrated, this concept being explained in more detail below on the basis of FIG. 2.

Figure 2:
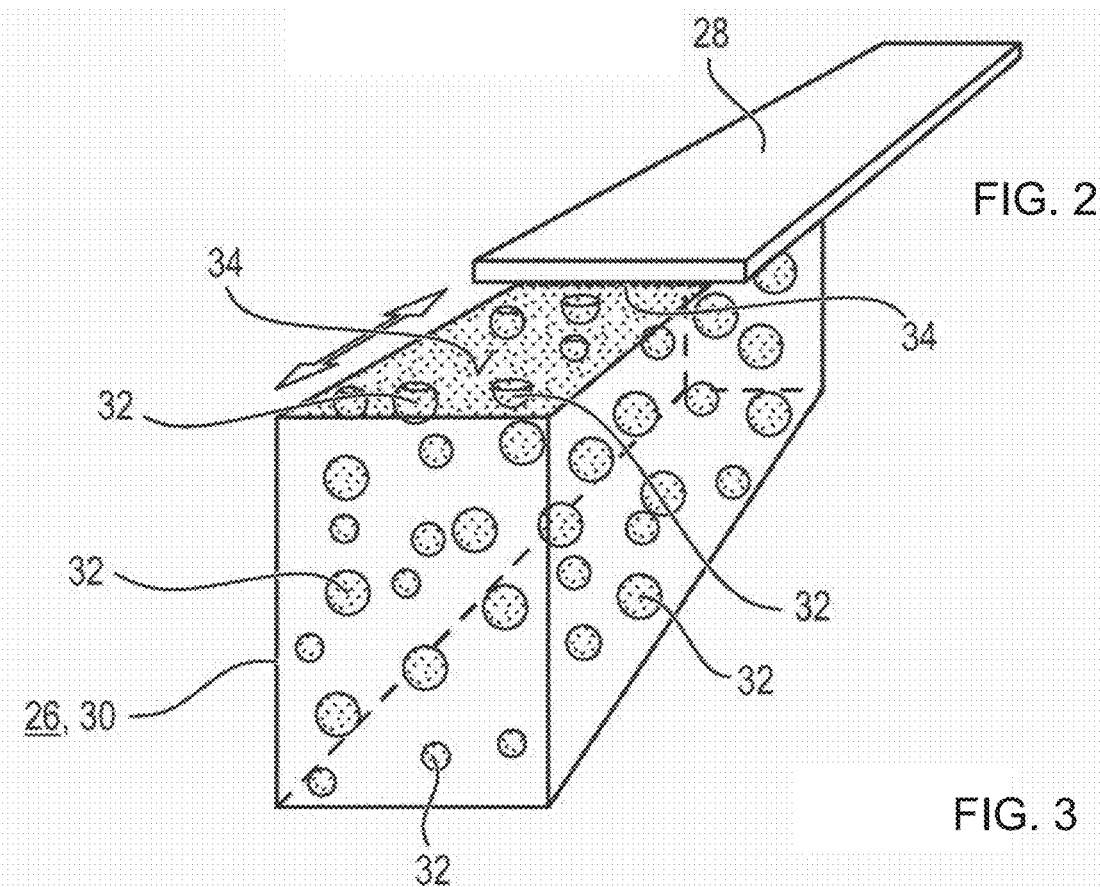
FIG. 2 is a perspective view of an interface between a plastics component and a metal component.

FIG. 2 shows a detail of a plastics component 26 and a metal component 28 in the region of an interface subject to mechanical or frictional loading. The site of the plastics component 26 that is subject to frictional loading is referred to as contact surface 30 below, wherein the metal component 28 is at least partially in mechanical touching contact with the contact surface 30 in the course of a relative movement with respect to the plastics component.

As can be seen in FIG. 2, in the region of the contact surface microcapsules 32 each filled with a lubricant, in particular a lubricating grease or lubricating oil, are embedded in the plastics material of the contact surface 30. Preferably, the microcapsules 32 are embedded with an even or homogeneous distribution throughout the plastics material of the plastics component 26. The microcapsules 32 for example comprise a shell material made of the same plastic as the contact surface 30. The microcapsules 32 are provided with reference signs merely by way of example in FIG. 2. The proportion of microcapsules 32 in the plastics material of the contact surface 30 is for example between 1% by weight and 20% by weight. The microcapsules 32 in this respect are preferably already embedded in a granulated plastic of the plastics material, with the result that a homogeneous distribution of the microcapsules 32 is ensured during the production of the plastics component 26.

In this case, the microcapsules 32 are designed such that they open when subjected to sufficiently high mechanical loading and release the lubricant 34 enclosed therein. The microcapsules 32 may have different capsule properties here, in particular different sizes, shapes, wall thicknesses etc., with the result that the microcapsules 32 open when subjected to different mechanical loads. In the event of mechanical loading, the plastics component 26 and the metal component 28 move relative to one another, this being indicated as a double-headed arrow in FIG. 2. The resulting frictional forces cause the microcapsules 32 on the surface of the contact surface 32 to open and thus the enclosed lubricant 34 to be released, which consequently is distributed on the surfaces of the plastics component 26 and the metal component 28 and wets them owing to the mutual movement. As a result, when the microcapsules 32 open, the lubricant 34 is released locally or at certain points at the sites of the contact surface 30 that are subjected to mechanical loading, and therefore reliable lubrication of the components 26, 28 is ensured.

The aforementioned lubrication concept can be applied to a multiplicity of different plastics and metal components 26, 28 in the case of the adjusting mechanism 12. Two possible application examples will be explained in more detail below by way of example on the basis of FIG. 3 and FIG. 4.

Figure 3:
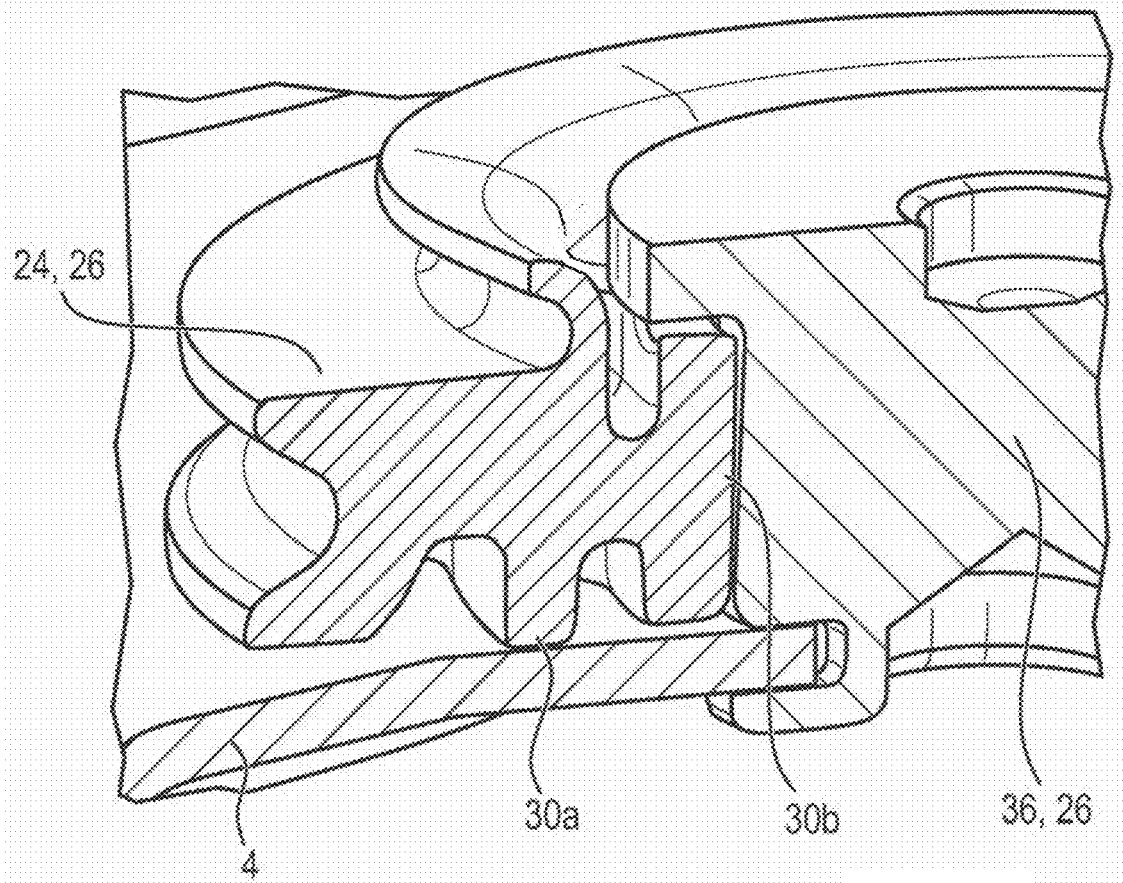
FIG. 3 is a perspective partial section view through an axis of a cable deflection roller and bolt.

FIG. 3 shows a cable deflection region of the window lifter 6. The deflection of the cable pull 16 is effected by means of the deflection rollers 24, which are arranged in the end face regions of the guide rail 18. The deflection rollers 24 in this case are placed on bearing points and rotatably mounted thereon. The bearing point in this case is in the form for example of a (mounting) bolt 36, which is held on the door module carrier 4. The bolt 36 substantially forms the axis of rotation of the deflection roller 24 here.

In the exemplary embodiment of FIG. 3, the deflection roller 24 is in the form of a POM injection molded part, wherein the bolt 36 is made of a metal. Thus, in this exemplary embodiment, the deflection roller 24 forms the plastics component 26, and the bolt 36 forms the metal component 28.

In this case, the deflection roller 24 has a first contact surface 30a of contact with the carrier plate 4 and a second contact surface 30b of contact with the bolt 36. The lubricant-filled microcapsules 32 are introduced in the contact surfaces 30a, 30b. As a result, reliable lubrication of the interfaces between carrier plate and deflection roller and between deflection roller and bolt when the deflection roller 24 is rotating is ensured.

The lubricant microcapsules 32 are particularly advantageous in the case of sliding interfaces. Such a sliding interface is produced for example between the rail slider 14 and the guide rail 18. The application of the lubrication concept is shown in FIG. 4 in this respect.

Here, the guide rail 18 has for example an L-shaped contour in cross section. The rail slider 14 has an integrally molded rail wraparound means 38 for this L-shaped contour of the guide rail 18. A sliding insert 40 that can be or is clipped in is fastened detachably in the rail wraparound means 38 and is in contact with the guide rail 14 by way of four contact surfaces 30a, 30b, 30c, 30d as punctiform running surfaces. The sliding insert 40 is in the form of a plastics part with particularly good sliding properties, that is to say with as low as possible a friction resistance with respect to guidance on the guide rail 14.

The rail slider 14 is for example made of a mechanically stable plastics material, with the result that adjusting forces of the adjusting mechanism 12 that act during operation can be guided securely and reliably. The rail slider 14 is for example made of a polyamide (PA), in particular a glass-fiber-reinforced polyamide (PA-GF), for example with a glass fiber content of approximately 35%. The sliding insert 40 is for example in the form of a POM injection molded part, wherein the guide rail 18 is made of a metal.

In this exemplary embodiment, the sliding insert 40 forms the plastics component 26 and the guide rail 18 forms the metal component 28. The microcapsules 32 are integrated in each of the four contact surfaces 30*a*, 30*b*, 30*c*, 30*d* here. The contact surfaces 30*a*, 30*b* and 30*c*, 30*d* in this respect are arranged opposite one another in pairs. The contact surfaces 30*a*, 30*b* are in contact with opposite sides of the vertical L leg of the guide rail 18, wherein the contact surfaces 30*c*, 30*d* are in contact with opposite sides of the horizontal L leg of the guide rail 18.

For example, it is possible to provide an activator, that is to say an activation tool or a mating contour on the metal component 28, which works the plastics component 26 or the contact surface 30 in the course of mounting and/or during operation of the window lifter 6 and thus causes the microcapsules 32 to open. In the case of an application according to FIG. 4, for example, a mating contour in the form of local surface roughening is provided in the region of a top and/or bottom end stop of the guide rail 18, with the result that the microcapsules 32 are opened in particular in the region of the mating contour or the end stop.

Although exemplary embodiments and applications have been elucidated in the description above, it should be pointed out that a multiplicity of modifications is possible. In particular, a lubrication concept according to the invention of this type is also suitable for the cable drum 22 as plastics component and the traction cable as metal component. Moreover, it should be pointed out that the exemplary embodiments are merely examples which are not intended to restrict the scope of protection, the applications and the structure in any way. Rather, the description above will provide those skilled in the art with a guide for converting at least one of the exemplary embodiments and it is possible to make various changes, in particular in terms of the application for the components of the adjusting mechanism 12, without departing from the scope of protection as it emerges from the claims and combinations of features equivalent thereto.

The following is a summary list of reference numerals and the corresponding structure used in the above description of the invention.

LIST OF REFERENCE SIGNS

2 Door module
4 Door module carrier
6 Window lifter
8 Window pane
10 Adjusting motor
12 Adjusting mechanism
14 Rail slider
16 Cable pull
18 Guide rail
20 Worm-gear/spur-gear transmission
22 Cable drum
24 Deflection roller
26 Plastics component
28 Metal component
30, 30*a*, 30*b*, 30*c*, 30*d* Contact surface
32 Microcapsule
34 Lubricant
36 Bolt
38 Rail wraparound means
40 Sliding insert P Pane position
S Closed position
O Open position

The invention claimed is:

1. A window lifter for a motor vehicle, comprising:
a metal component; and
a plastic component having a contact surface, said plastic component being at least partially in mechanical touching contact with said metal component on said contact surface, and said plastic component having microcapsules filled with a lubricant being embedded in a plastic material of said plastics component at least in a region of said contact surface, said microcapsules constructed with different geometric properties for opening said microcapsules at different instances based upon mechanical loading thereon.

2. The window lifter according to claim 1,
wherein said plastic material is a polypropylene, a polyoxymethylene, or a polyamide-6.

3. The window lifter according to claim 1,
wherein a proportion of said microcapsules in said plastics material of said contact surface is between 1 weight percent and 20 weight percent.

4. The window lifter according claim 1,
wherein said microcapsules are made of said plastic material.

5. The window lifter according to claim 1,
wherein:
said plastic component is a sliding insert of a rail wraparound means of a rail slider; and
said metal component is a guide rail, around said guide rail said rail wraparound means at least partially engages.

6. The window lifter according to claim 1,
wherein said plastic component is a deflection roller, and said metal component is a bolt which mounts said deflection roller.

7. The window lifter according to claim 1,
wherein said plastic component is a cable drum, and said metal component is a cable wound up on said cable drum.

8. The window lifter according to claim 1,
wherein said microcapsules are distributed throughout said plastic material of said plastic component.

9. The window lifter according to claim 8,
wherein said microcapsules are homogeneously distributed in said plastic material.

10. The window lifter according to claim 1, wherein said different geometric properties are shapes, diameters, and wall thicknesses.

11. The window lifter according to claim 1,
wherein said contact surface is worked by an activation tool in a course of mounting in such a way that at least some of said microcapsules are made to open and release said lubricant on said contact surface.

12. The window lifter according to claim 11,
wherein said metal component has a mating contour for selective release of said lubricant.

13. A door module for a motor vehicle, the door module comprising:
a door module carrier; and
said window lifter according to claim 1 disposed on said door module carrier.

14. A method of forming a window lifter, which comprises the steps of:
providing a metal component; and distributing microcapsules filled with a lubricant in a granulated plastic, the microcapsules constructed with different geometric properties for opening the microcapsules at different instances based upon mechanical loading thereon; and producing a plastic component from the granulated plastic for the window lifter, the plastic component having a contact surface and being at least partially in mechanical touching contact with the metal component on the contact surface, and the plastic component having the microcapsules filled with the lubricant being embedded in the granulated plastic of said plastic component at least in a region of the contact surface.

\* \* \* \* \*